United States Patent Office 2,739,216
Patented Mar. 20, 1956

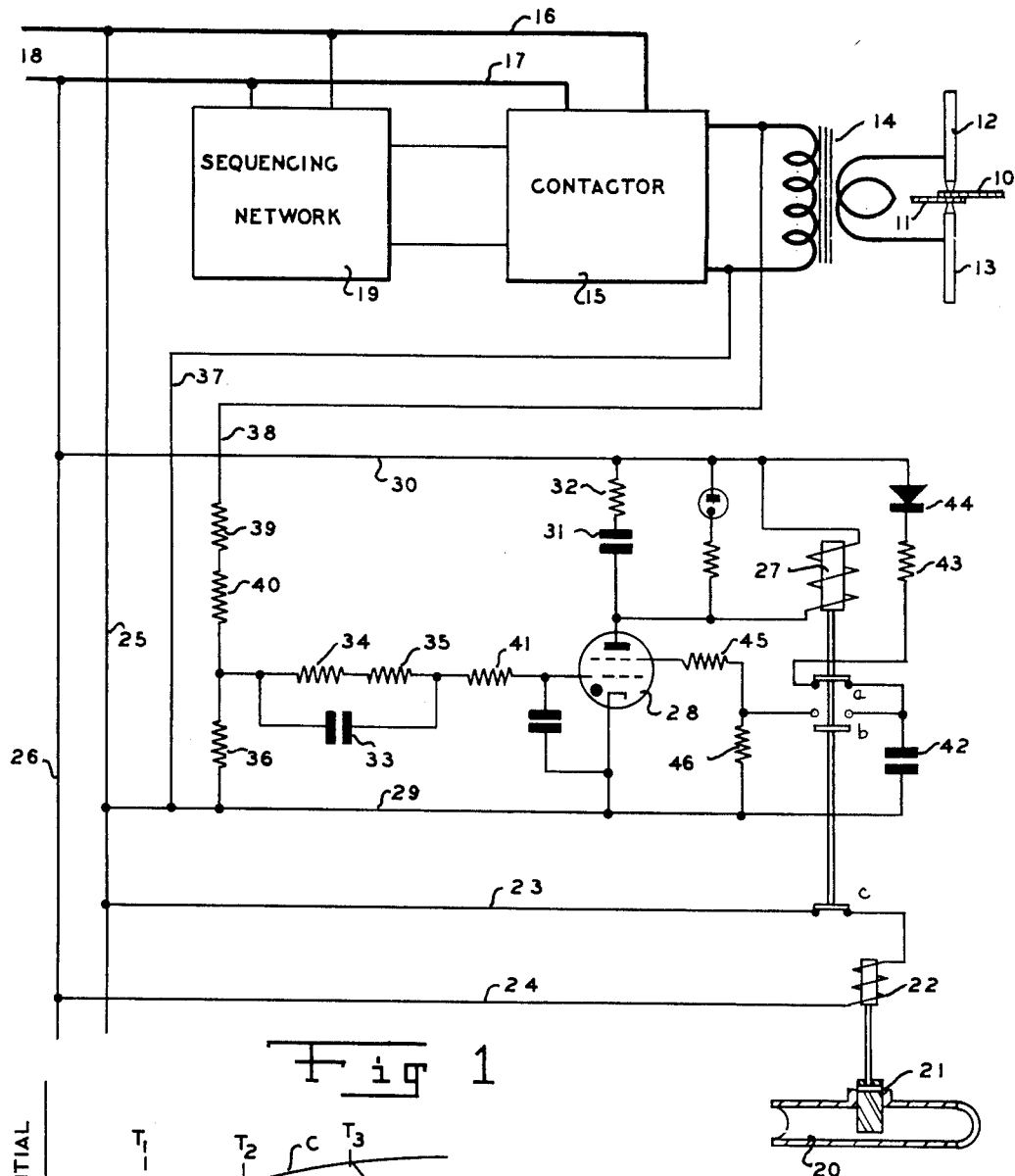
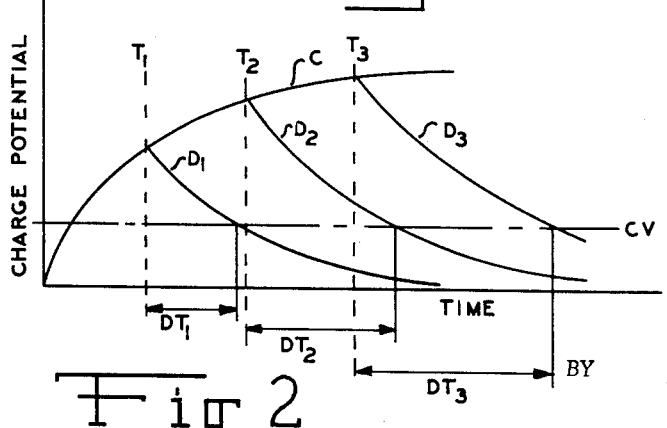

2,739,216

COOLANT FLOW CONTROL FOR ELECTRIC RESISTANCE WELDERS AND THE LIKE

Joseph J. Riley, Warren, Ohio, assignor to The Taylor-Winfield Corporation, Warren, Ohio, a corporation of Ohio Application February 4, 1955, Serial No. 486,053

8 Claims. (Cl. 219—4)

The present invention relates to the art of electric welding and heating, and more particularly to a control system for monitoring the flow of coolant fluid in an electric welder or heater.

As an overall object, the present invention seeks to provide a novel and improved control circuit or apparatus which is adapted to control the flow of coolant fluid through an electric welder or heater in such manner that adequate cooling protection is afforded, while at the same time there is no unnecessary use or wastage of coolant.

A more specific object of the invention is the provision of a novel coolant flow control for use in electric resistance welders, for example, wherein coolant fluid is caused to flow in the welder or other device in direct response to energization thereof for a welding or heating operation and wherein the flow of coolant is terminated in direct response to the deenergization of the welder, all in a manner wholly independent of other control functions incorporated into the operation of the welding or heating apparatus. Thus, it is common practice in the electric resistance welding art, for example, to utilize with the welding apparatus a suitable sequencing control circuit or unit which effects the timed operation of the welding electrodes, application of welding current and the like. In the prior art, coolant flow control has been commonly incorporated into such sequencing control, the flow coolant being started and stopped as part of the sequence of operations. My control apparatus, as will hereafter appear, operates wholly independently of the sequencing circuit, and receives its energizing and deenergizing stimuli directly from the welding transformer or other primary energy circuit. Thus, in cases where the sequencing circuit operates in the usual manner, but for some reason the welding transformer does not energize, as during set-up operations, or where ignitron contactors fail to fire, the coolant flow does not initiate unnecessarily.

Another object of the invention is the provision of a novel and highly improved coolant flow control circuit which is arranged to initiate the flow of coolant fluid in response to the energization of the welding transformer or other primary energy circuit and to terminate the flow of coolant a predetermined time after the deenergization of such primary energy circuit, such predetermined time being variable automatically in corresponding relation to the quantity of energy passing through the primary energy circuit.

More specifically, with respect to the above, it is an object of the present invention to provide an improved coolant flow control circuit, including novel timing means, whereby following short applications of energy to the primary energy circuit there is a relatively short extended flow period during which coolant fluid continues to flow, while following longer periods of energy application there is a longer extended coolant flow period, up to a predetermined maximum which is sufficient in all cases.

Another object of the invention is the provision of a novel electronic coolant flow control circuit which is of a "fail safe" nature—that is, in the event of failure of critical electronic valves or relays there will be a continued flow of coolant through the apparatus to be cooled, so that in no case is there danger of a complete loss of cooling capacity.

Yet another object of the invention is the provision of a control circuit for timing the period of extended flow of a coolant fluid following a welding or heating operation wherein is incorporated a novel and improved arrangement for insuring the proper actuation of the circuit components at the end of a timing period.

A further object of the invention is the provision of a coolant flow control circuit for the purpose and having the above described characteristics which is of an essentially simple nature, capable of economical manufacture, installation and maintenance.

The above and other objects of the invention will become apparent upon full consideration of the following detailed specification and accompanying drawing wherein is disclosed a certain preferred embodiment of the invention.

In the drawing:

Figure 1 is a simplified schematic representation of a coolant flow control circuit incorporating the teachings of my invention; and Figure 2 is a graphic illustration of the timing control effects of the circuit of Figure 1.

Referring now to the drawing, the numerals 10 and 11 represent overlapped workpieces in position for electric resistance welding. Opposed electrodes 12 and 13 are positioned on opposite surfaces of the workpieces 10 and 11, and are connected to the low-voltage secondary of a suitable welding transformer 14. The transformer, in turn, is connected, through a suitable contactor 15, preferably of an electronic type, to supply lines 16 and 17, leading to a suitable A. C. power source 18. In accordance with general practice, there is also provided a sequencing network, generally indicated at 19, which includes suitable circuitry for the timed manipulation of the electrodes 12 and 13 and energization of the contactor 15 and welding transformer 14.

To cool the welding transformer, electrodes and other critical parts of the welding apparatus there are conventionally provided water or coolant passages, not specifically shown, which pass through the various above mentioned components and which are connected to a supply pipe or conduit 20 leading to a commercial water source, for example, and having a flow control valve 21 therein.

In the illustrated embodiment of the invention, the flow control valve is provided with a solenoid operator 22 which connects the electrical supply source 18 through conductors 23—26 and normally closed contacts 27c of a control relay 27, to be hereafter described. The arrangement is such that when the contacts 27c are closed operator 22 is energized and the valve 21 is open, permitting flow of coolant to the desired parts of the welding apparatus.

Relay 27 is connected in series with the anode-cathode circuit of, and is thereby controlled by a gaseous discharge device 28, so that whenever the discharge device or valve 28 is conducting relay 27 is energized and the valve 21 is caused to close.

Anode-cathode potential for valve 28 is derived from the source 18, through supply conductors 25 and 26, and through conductors 29 and 30 connecting the last mentioned supply conductors respectively. Thus, at all times when the supply source 18 is energized, anode-cathode potential is furnished the valve 28, and the same will normally conduct on alternate half-cycles of supply voltage. The normal half-cycle conduction in valve 28 is sufficient to maintain the relay 27 in a continuously energized condition through the provision of a series capacitor-resistor energy storage network 31—32 in parallel with the coil of relay 27, in accordance with known practice.

In order to initiate the flow of coolant to the welding apparatus, by opening valve 21, it is first necessary to terminate conduction in valve 28 and deenergize relay 27. To this end I have provided, in accordance with the teachings of the invention, a control grid circuit for the valve 28 which includes a capacitor-resistor parallel network 33—35 which is connected in series with the control grid. The outer terminal of the capacitor 33 is referenced to the cathode of valve 28 through a resistor 36 and through conductor 29.

Across the terminals of resistor 36 are connected conductors 37 and 38, including series resistors 39 and 40, which conductors are connected to opposite terminals of the primary coil of welding transformer 14. The arrangement is such that upon energization of the transformer 14 a voltage is applied to the conductors 37 and 38, a proportional amount of which is applied across the terminals of resistor 36 to vary the potential of the control grid circuit with respect to the cathode of valve 28. And in accordance with the teachings of the invention the conductors 37 and 38 are so arranged with respect to conductors 29 and 30 that the anode-cathode potential supplied to valve 28 is reverse in polarity to the potential applied across the end terminals of resistor 36.

Thus, it will be understood that while the valve 28 is normally conducting whenever source 18 is energized, at such times as the welding transformer is energized a positive potential is applied to the grid of valve 28 during the non-conducting half-cycle periods thereof. By this means the valve 28 is caused to conduct from cathode to grid, charging the capacitor 33 so that the grid-side terminal thereof becomes negative with respect to the upper or grid-side terminal of resistor 36. After a very few cycles of grid rectification, or conduction between cathode and control grid, in valve 28 the capacitor 33 becomes sufficiently charged so that further cathode-anode conduction in valve 28 is blocked. At this time relay 27 is deenergized and water or other cooling fluid begins to flow in the cooling system, through then open coolant valve 21.

Valve 28, of course, remains non-conducting as long as capacitor 33 remains charged, which is all during the time when welding transformer 14 is energized, and a predetermined time thereafter during which capacitor 33 discharges sufficiently through resistors 34 and 35 to unblock valve 28.

It is contemplated in the present invention that the discharge resistors 34 and 35 for timing capacitor 33 will be of a very high value, so that following the energization period of transformer 14 there is a two or three minute period wherein the capacitor 33 slowly discharges to a critical potential value at which valve 28 will again begin to conduct to end the flow of coolant.

As one of the outstanding features of this invention, I further provide that current limiting resistor 41, connected in series with the grid-side terminal of timing network 33—35 is of a large value, so that charging of capacitor 33 takes place at a relatively slow rate. Thus, even though valve 28 may be blocked against cathode-anode conduction after a very few cycles, the cathode-grid conduction of the valve continues until the charge on capacitor 33 is such with respect to the potential applied across the terminals of resistor 36 as will no longer sustain substantial cathode-grid conduction in valve 28. At this time further grid rectification in valve 28 will merely serve to maintain the charge upon capacitor at a sustained level.

In the operation of electric resistance welding apparatus, for example, the total period of energization of the transformer 14 may be a relatively few cycles, variable a few cycles for different types and sizes of workpieces to be welded. Therefore, in accordance with the teachings of this invention the capacitor 33 will not, except in cases of long sustained periods of energization, become fully charged during a welding operation, but will charge to a potential which will vary with the length of the welding period. Thus, when the welding operation terminates and timing capacitor 33 begins to discharge, the discharge time will vary in accordance with the level of hte charge upon the capacitor. By this means I may effect a longer or shorter extended coolant flow period which is variable in accordance with the length of the welding period. If the welding period is short, so that a minimum amount of heating occurs in the welding apparatus, the extended flow period is automatically correspondingly shorter, and vice versa.

Referring now to Figure 2, illustrating the principle discussed above, the convex curve C represents the R-C charging curve for the capacitor 33, such curve being plotted against units of time as an abscissa and units of charge potential as an ordinate. Vertical dotted lines $t_1$, $t_2$ and $t_3$ represent elapsed time periods, corresponding to welding periods, for example, and it will be observed that the level of charge of the capacitor 33 increases with the length of the welding period, up to a maximum limit.

Reference characters $D_1$, $D_2$ and $D_3$ represent discharge curves for the capacitor 33, plotting charge potential against time, where the capacitor begins to discharge at times $t_1$, $t_2$ and $t_3$ respectively.

As the timing capacitor 33 discharges below a predetermined critical voltage, represented by the dashed line CV in Figure 2, valve 28 is caused to conduct, so that the extended coolant flow period is determined by the time required for capacitor 33 to discharge from its charged potential to the critical potential CV. Such discharge time periods are indicated on the graph of Figure 2 by reference characters $DT_1$, $DT_2$ and $DT_3$, and it will at once be observed that the required discharge time is correspondingly greater for increased charging periods, up to a maximum charge. Of course, the timing components are so arranged that the total extended coolant flow period, corresponding to a full charge on capacitor 33, is sufficient for all cases.

As will be understood, since the primary timing capacitor 33 discharges over a long period (two or three minutes in some cases), the control grid potential of valve 28 may be held around the level of the critical firing potential for a period of several cycles, during which period the firing of valve 28 may tend to be erratic, in the event of line voltage variations and the like. Thus, to assure that valve 28 having once fired to end an extended coolant flow period continues to conduct uniformly, I have provided a novel circuit arrangement adapted upon the initial firing of valve 28 to apply a highly positive control signal to the screen grid thereof to sustain conduction for a short period of time sufficient to permit capacitor 33 to discharge substantially below the critical voltage level.

Thus, connected in parallel with the anode-cathode circuit of valve 28, or directly across the source 18, is a circuit which includes a capacitor 42, resistor 43, rectox unit 44, and normally closed contacts 27a of relay 27. When valve 28 is extinguished or rendered non-conductive at the start of a welding operation relay 27 is deenergized and capacitor 42 is connected across the source 18 through contacts 27a. This causes the capacitor 42 to charge through the resistor 43 and rectox 44 so that the upper terminal of capacitor 42 is highly positive.

Upon termination of the weld, and timing out of the extended coolant flow period, valve 28 again becomes conductive energizing relay 27 to open contacts 27a and close contacts 27b. This connects the upper or positive terminal of capacitor 42 directly to the screen grid of valve 28, through current limiting resistor 45 so that conduction is sustained in valve 28 for a predetermined time as capacitor 42 discharges through parallel-connected resistor 46. After capacitor 42 becomes substantially discharged, of course, the primary timing capacitor 33 has discharged well beyond the critical level and valve 28 continues to conduct.

It will be observed that in order to prevent the flow of coolant through the conduit 20 valve 28 must be conducting and relay 27 must be in an energized condition. Thus, in the event of a failure of either of these components coolant will flow continuously through the welding apparatus to insure against the possible overheating thereof. In this manner the circuit is rendered completely "fail safe" as to the components thereof which are likely to fail after long periods of use.

It should now be apparent that I have fulfilled the several objects initially set forth. My invention provides a novel and highly improved arrangement for controlling the flow of coolant fluid to a heating or welding apparatus in such manner that adequate cooling is obtained in all cases without unnecessary waste of the coolant. And, while I am aware that arrangements have been heretofore proposed for accomplishing the same general result, it is believed that none of the prior arrangements operate in the manner herein described or obtain the improved results possible with my apparatus.

One of the novel characteristics of my invention resides in the fact that the coolant flow control circuit is energized or activated directly from the welding transformer or other primary energy circuit so that no coolant flows during set-up operations and other occasions where the sequencing or other control networks may be operated without actually energizing the primary energy circuit.

In addition to this, by activating the coolant flow control circuit directly from the primary energy circuit I may advantageously provide for variable extended coolant flow periods to have corresponding relation to the period of energization of the primary energy circuit. Of course, it would no doubt be possible to incorporate this last mentioned feature even in cases where the coolant flow control is activated from a sequencing network, for example, and the invention, insofar as it includes this feature, should be considered as encompassing such applications; but it will be readily understood that I may accomplish this in a highly simplified and essentially fool-proof manner when activating directly from the primary energy circuit.

In order to effect a variable extended coolant flow period I have employed a gaseous discharge device the conductivity of which is controlled by a timing capacitor arranged to be charged and discharged at a slow rate. Thus, during operation of the welding or heating apparatus the timing capacitor charges slowly; and at any time before the maximum charging time the level of the charge upon the timing capacitor will correspond to the duration of the welding or heating time. Accordingly, the discharge time for the capacitor is correspondingly greater or less, in predetermined relation to the welding or heating time.

The above features are perhaps the most important of my present invention. However, there are included additional novel features and improvements for insuring that the circuit will properly function to end coolant flow at the end of the extended coolant flow period, and for insuring "fail safe" operation so that in no event is the welding or heating apparatus without coolant during welding or heating operation. If there is any failure of critical circuit components the effect is merely to permit the coolant to flow beyond its normal flow period.

It should be understood, however, that the embodiment herein specifically illustrated and described is intended to be illustrative only, as certain changes and modifications may be made therein without departing from the clear teachings of the invention. Reference should therefore be had to the following appended claims in determining the full scope of the invention.

I claim:

1. In combination with welding or heating apparatus of the type having a primary energy circuit and means to supply coolant to critical parts of the apparatus; an improved circuit for controlling the flow of coolant comprising an electronic valve having an anode, cathode and control electrode, means responsive to the condition of said valve to provide for the flow of coolant fluid during periods of non-conductivity of said valve and to prevent the flow of coolant fluid during periods of conductivity of said valve, a source of electrical energy connecting with said primary energy circuit and with the anode-cathode circuit of said valve, said valve being normally conductive, means to render said valve non-conductive for timed periods comprising said control electrode and a capacitor-potentiometer network associated therewith, and means including said primary energy circuit for charging said capacitor, for rendering said valve non-conducting, the arrangement being such that upon energization of said primary energy circuit said capacitor is charged and upon deenergization of said primary energy circuit said capacitor discharges at a timed rate to render said valve conductive a predetermined time following deenergization of said primary energy circuit.

2. In combination with welding or heating apparatus of the type having a primary energy circuit and means to supply coolant to critical parts of the apparatus; an improved circuit for controlling the flow of coolant comprising an electronic valve having an anode, cathode and control electrode, means responsive to the condition of said valve to provide for the flow of coolant fluid while said valve is in a first condition and to prevent flow of coolant fluid while said valve is in a second condition, a source of anode-cathode potential for said valve, said valve normally being in said second condition, means to render said valve in said first condition comprising said control electrode and a timing circuit, and means to energize said timing circuit for rendering said valve in said first condition comprising said primary energy circuit, said timing circuit being operative to maintain said valve in said first condition for an extended time period.

3. Apparatus according to claim 2 further characterized by said timing circuit comprising a capacitor and resistor and having a relatively high time constant, said means to energize comprising a charging circuit for said capacitor and including a high resistance whereby the charging period for said capacitor is relatively long, the arrangement being such that for correspondingly longer periods of energization of said primary energy circuit said timing circuit maintains said valve in said first condition for correspondingly longer time periods following such periods of energization.

4. Apparatus according to claim 2 further characterized by said timing circuit comprising a capacitor and resistor and having a relatively high discharging time constant, and further including means operative upon said capacitor discharging to render said valve in its second condition to maintain said valve in said second condition for a predetermined interval to permit further discharging of said capacitor.

5. Apparatus according to claim 4 further characterized by said last mentioned means comprising a capacitor, means to connect said capacitor to a charging circuit when said valve is in said first condition, and means including a second control electrode of said valve to impress the charged potential of said capacitor upon said valve upon the same being initially rendered in said second condition.

6. In combination with welding or heating apparatus of the type having a primary energy circuit and means to supply coolant to critical parts of the apparatus; an improved circuit for controlling the flow of coolant comprising an electronic timer, means responsive to a first condition of said timer to provide for the flow of coolant fluid and responsive to a second condition of said timer to prevent the flow of coolant fluid, circuit means connecting said timer to opposite terminals of said primary energy circuit, said circuit means including means responsive to energization of said primary energy circuit to render said timer in said first condition and means responsive to the termination of energization of said primary energy circuit and operative a predetermined extended delay period thereafter to render said timer in said second condition.

7. Apparatus according to claim 6 further characterized by said last mentioned means including a capacitor-resistor time constant network, and further including means to charge said network to a level having corresponding relation to the period of energization of said primary energy circuit.

8. Apparatus according to claim 7 further characterized by said timer including a gaseous discharge valve, said valve being non-conductive when the timer is in said first condition and conductive when said timer is in said second condition.

References Cited in the file of this patent

UNITED STATES PATENTS

| | | |
|---|---|---|
| 2,001,688 | Paugh | May 14, 1935 |
| 2,091,219 | Sciaky | Aug. 24, 1937 |